Sept. 3, 1968   H. BRACHVOGEL ET AL   3,399,592
DEVICE FOR VIEWING THE SURFACE OF CYLINDRICAL OBJECTS
Filed May 15, 1963
FIG. 1
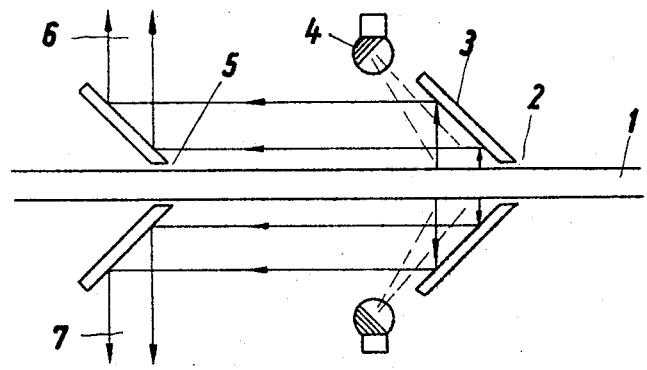
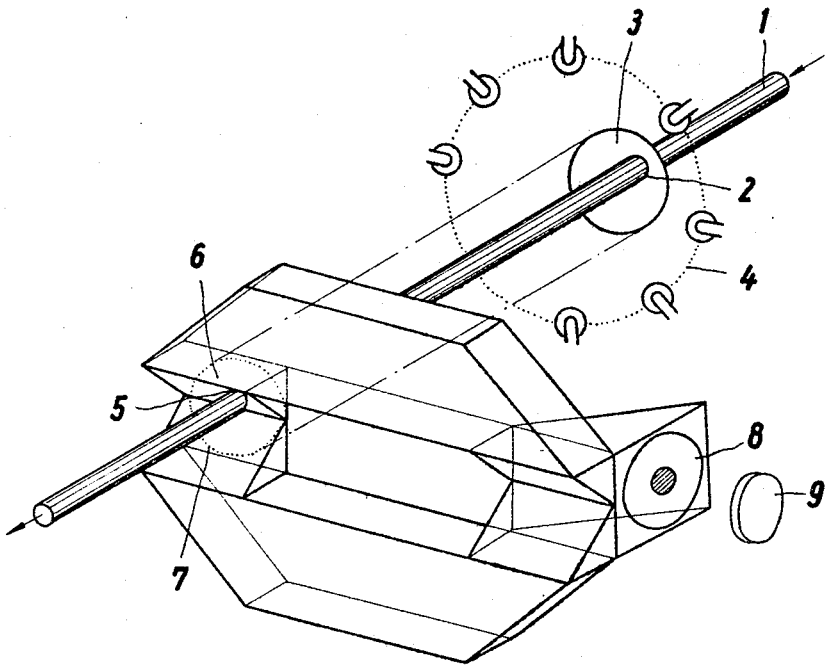
FIG. 2
Inventor:

United States Patent Office 3,399,592
Patented Sept. 3, 1968

3,399,592
DEVICE FOR VIEWING THE SURFACE OF CYLINDRICAL OBJECTS
Heinz Brachvogel, Aubundt 750, Vaduz, Liechtenstein, and Gerhard Pickroth, Rossfeldstrasse 16, Schaan, Liechtenstein
Filed May 15, 1963, Ser. No. 280,692
Claims priority, application Germany, May 19, 1962, B 67,325
5 Claims. (Cl. 88—14)

Viewing devices for a closed panoramic representation of the inside boundary surfaces of hollow bodies of all kinds, including human organs formed with cavities, have already been disclosed. It is also known to provide image-forming cameras with a rotatable device disposed before the lens and enabling the formation of an image of a plane development of the surface of a body connected to this device, for instance, the piston of a body. The surface of bodies has also been viewed with the aid of mirrors which enable the formation of an image of the rear side of a body while the front side is being viewed directly. This arrangement has the disadvantage, however, that the front image does not adjoin the rear image so that a coherent image is not formed. Whereas viewing means rotating about the object to be viewed, for instance, in the form of scanning microscopes, do enable an observation of the surface of the body, the image field always covers only a part of the periphery of the body and an image of the entire surface cannot be formed. For this reason, the known proposals are limited in application. On the other hand, it is desired in many cases to give a comprehensive, uninterrupted representation of the entire outer boundary surface of a body, for instance, to become exactly aware of the position, depth and degree of a progressive wear. The same applies to the quality of the surface of tubes, wires, rods, cables and the like, for a continuous observation of tensile breaking processes of bar specimens and the continuous inspection, for instance, of reactor rods; in this connection, photographic pictures may be required for a permanent record of the processes.

It is an object of the present invention so to design the viewing device that it enables a closed, panoramic representation of the surface of an elongated body, for instance, of the above-mentioned reactor rods, as well as the use of photographic cameras for making a permanent record of these closed panoramic images.

The device proposed to accomplish this object is characterized according to the invention by the arrangement of a funnel-like mirror, which is coaxial with the longitudinal axis of the illuminated body to be viewed and which has a central opening through which the body can be passed, and of reflecting surfaces which face the cavity of the mirror and are inclined preferably at equal angles with respect to the axis of the body and the optical axis of the mirror, the inner boundary edges of said reflecting surfaces forming a second opening through which the body can be moved and which is at least as large as the cross-sectional diameter of the body to be viewed, and further reflecting faces being arranged along paths of rays deflected at the first-mentioned reflecting surfaces and combining the paths of rays in a manner known per se in a viewing plane to form a continuous panoramic image.

When illuminating members arranged around the body to be viewed are radially outwardly offset from the reflecting faces formed by the reflecting faces, a glare-free illumination of the body to be viewed will be obtained.

The viewing device need not be rotation-symmetrical with respect to the optical axis. In the first place, the body to be viewed may be rotation-asymmetrical in itself, so that the device must be similarly asymmetrical to avoid distortion. Alternatively, it may be desired to form an asymmetrical image of an inherently rotation-symmetrical body to be viewed because certain zones of the body, for instance, strips extending along a generatrix, should be represented in an image in which they are distorted and exaggerated in width because the condition of these strips is of special significance for certain reasons.

The drawing shows an embodiment of the invention and illustrates the design of the viewing device when used for viewing a rotation-symmetrical wire.

FIG. 1 is a longitudinal sectional view showing the device with the main paths of rays, and FIG. 2 is a perspective view showing the entire device.

The outside surface of the wire 1 is to be inspected. The wire extends through the central passage aperture 2 of a funnel-like mirror, which is coaxially arranged with respect to the longitudinal axis of the body 1 to be viewed. Its surface is illuminated by illuminating members arranged in a circular series 4 around the axis of the wire 1. The individual illuminating members shown may be replaced by an illuminating member in the form of a closed ring. The illuminating members need not emit light constantly, but it is possible to use illuminating members for generating electronic flashes. The drawing shows that the illuminating members are radially outwardly offset from the reflecting surface of the mirror 4, so that the body 1 to be viewed can be viewed or represented without glare.

In conjunction with the funnel-like mirror 3, plane reflecting surfaces are provided, which face the cavity of the mirror and are inclined at equal angles to the axis of the wire 1 and the optical axis of the mirror system. The confronting inner boundary edges of these reflecting surfaces form a slot-like second opening 5 for the passage of the wire 1, which opening 5 is at least as large as the diameter of the wire, and the imaginary line of intersection of these reflecting surfaces is at right angles to the optical axis. The device is divisible in a plane passing through the axis of the wire and of mirror 3, and along the slot-like opening, so that it can be remoded without dividing the body. Further reflecting surfaces, which are apparent from the lower part of the figure, are disposed in the paths of rays 6 and 7 deflected by the reflecting surfaces mentioned first and combine the paths of rays 6, 7 in a viewing plane 8 to form a continuous panoramic image. In the present example, these further reflecting surfaces are formed by prisms having a trapezoidal cross-section, whereas prism squares attached to the larger parallel surface of the trapezoidal prisms, in conjunction with a third prism square, establish the desired path of rays, in which the optical system 9 is inserted, before which either the eye of the observer or a camera or a television device is disposed.

It is inherent in the nature of the invention that it is not restricted to the illustrative embodiment shown on the drawing and described. The described symmetric structure of the device enables, however, a mechanical separation and reassembly of the upper and lower halves of the device without any change in the ability to view the entire periphery of the body to be viewed. Alternatively, an aspherical design of the device may be suitable for adaptation to special requirements.

What is claimed is:
1. A device for forming a panoramic image of a peripheral portion of an elongated body, comprising, in combination, reflecting means having an annular reflecting surface surrounding said boly and slanted to the axis of the same to project an image of a peripheral portion of the same in axial direction of said body; a pair of light deflecting means forming an opening in which said body is located, and having light deflecting surfaces respectively located opposite halves of said reflecting surface space therefrom in said axial direction and slanted to the axis of said body to deflect the corresponding halves of said image in directions transverse to said axis; and optical means for combining said image halves in a combined image at a point transversely spaced from said body whereby the combined image can be ovserved without viewing along the axis of said body.

2. A device as defined in claim 1 wherein said reflecting means having an annular reflecting surface is a frustoconical mirror having a central aperture for said body, said opening and said aperture permitting axial movement of said body.

3. A device as defined in claim 1 and including illuminating means for illuminating said portion of said body, and positioned in relation to said reflecting surface so that the same is not illuminated by said illuminating means.

4. A device for forming a panoramic image of a peripheral portion of an elongated body, comprising, in combination, reflecting means having an annular reflecting surface surrounding said body and slanted to the axis of the same to project an image of a peripheral portion of the same in axial direction of said body; a first pair of deflecting means forming an opening in which said body is located, and having deflecting surfaces respectively located opposite halves of said reflecting surface spaced therefrom in said axial direction and slanted to the axis of said body to deflect the corresponding halves of said image in directions transverse to said axis; a second pair of deflecting means having slanted deflecting surfaces; and a pair of prisms extending transversely to said axis and having end portions cooperating with said first and second pairs of deflecting means, respectively, for guiding rays repersenting said image halves from said first pair of deflecting means to said second pair of deflecting means so that the deflecting faces of the latter combine the image halves in a combined image at a point transversely spaced from said body whereby the combined image can be observed without viewing along the axis of the body.

5. A device as defined in claim 1 wherein said reflecting means having an annular reflecting surface is a funnel-shaped mirror asymmetrically disposed to the axis of said elongated body for producing a distorted image of said peripheral portion.

References Cited
UNITED STATES PATENTS

| | | | |
|---|---|---|---|
| 3,019,698 | 2/1962 | Sheldon | 88—1 XR |
| 3,052,229 | 9/1962 | Wenger. | |

FOREIGN PATENTS

| | | |
|---|---|---|
| 515,973 | 6/1938 | Great Britain. |
| 646,760 | 6/1938 | Great Britain. |

JEWELL H. PEDERSEN, *Primary Examiner.*

O. B. CHEW, *Assistant Examiner.*